United States Patent Office 3,148,240
Patented Sept. 8, 1964

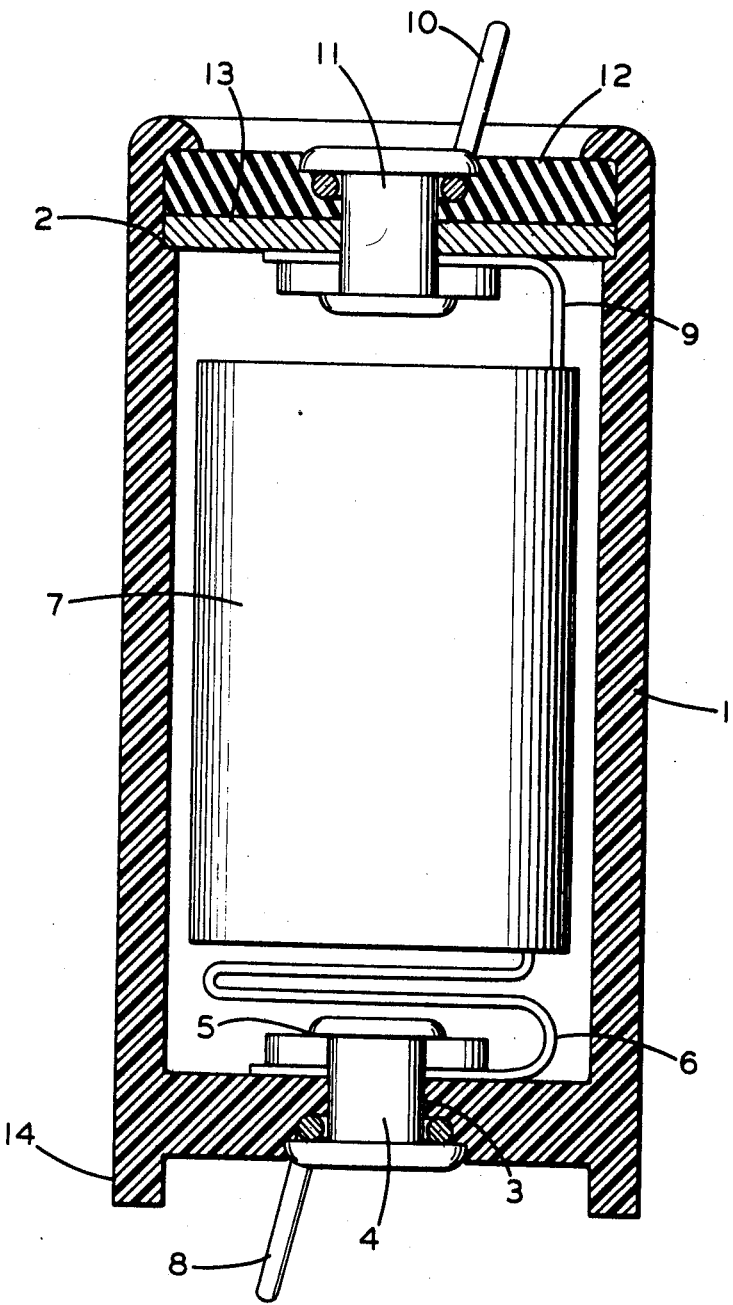

3,148,240
CYLINDRICAL CAPACITOR HOUSING
Reginald James Harrison, Southall, England, assignor to Sprague Electric Company, North Adams, Mass., a corporation of Massachusetts
Filed May 26, 1961, Ser. No. 112,828
Claims priority, appplication Great Britain May 26, 1960
3 Claims. (Cl. 174—50.52)

This invention relates to a housing for cylindrical electrolytic capacitors, and more particularly to plastic cased cylindrical electrolytic capacitors having fluid-tight closure members permitting the axial extension of lead-wires from the ends of the capacitor.

Plastic cased electrolytic capacitors have been an objective of the art for a number of years. Various attempts have been made to mold plastic casings directly around wet electrolytic capacitance sections. Other attempts have been made to house electrolytic capacitance sections in premolded plastic casings with various end-seals for closing the open ends of the casings. The premolded cases have involved the undesirable practice of requiring that all of the terminals from the capacitance section emerge from a single end of the container so as to lessen the leakage problem. Moreover, none of the prior art attempts at plastic cased electrolytic capacitors has been entirely satisfactory in eliminating electrolyte leakage from the small size capacitance sections which traditionally employ oppositely extending axial leads.

It is an object of this invention to overcome the above and related deficiencies of the prior art.

It is another object of this invention to produce a plastic case electrolytic capacitor of fluid-tight construction having oppositely extending axial leads.

These and other objects of this invention will become more apparent upon consideration of the following description taken together with the accompanying drawing, in which:

The sole figure is a vertical section of a completed capacitor constructed in accordance with this invention.

The objects of this invention are obtained by a cylindrical electrolytic capacitor housing in which the casing is a premolded thermoplastic material closed at one or both ends by a composite closure member which provides a fluid-tight seal with the casing and permits the axial extension of a lead-wire. The composite disc of this invention consists of an outer layer of rubber forming at its periphery a fluid-tight seal with the casing, and an inner layer of relatively rigid material supporting the rubber layer. The margin or lip of the theromplastic casing is turned over by the application of heat and pressure to maintain the composite disc in compressive fluid-tight engagement with the inner surface of the casing.

To ensure that an effective fluid-tight seal is obtained between the periphery of the composite disc and the internal surface of the casing, the preferred embodiment of this invention utilizes a rubber layer of greater diameter than the internal diameter of the casing, and of greater diameter than the rigid member of the disc. Compression of this disc within the casing compresses the rubber to bear on the casing with sufficient radial force to obtain the required sealing effect.

The thermoplastic casing of this invention is conveniently made by an injection molding process. Although polystyrene and polyethylene are successful materials for the casing, it is preferred that polypropylene be employed because of its superior sealing properties. The casing is preferably provided with an internal shoulder which provides a seat for the composite disc. The open end or ends may be flared to facilitate insertion of the composite disc.

The composite discs of this invention are readily produced from a composite sheet of rubber and rigid material by a stamping process in which the diameter of the rubber layer is made greater than that of the rigid layer. The rigid layer may be of a thermoset resin, such as a phenolic. However, it is preferred that a metal compatible with the metal of the capacitance section be employed, e.g., aluminum with an aluminum foil capacitance section.

The required forming of the open end of the casing is appropriately performed by a pressing tool having heating means to produce a temperature in excess of the softening temperature of the casing material. The heated pressing tool is brought to bear on the open end of the casing to deform the casing into the internal contours of the tool. It is desirable to reduce the temperature of the casing material while still in contact with the tool to prevent the compressed composite disc from exerting pressure against the softened lip of the casing, and thereby releasing the seal. The reduction in temperature may be obtained by chilling the tool, as for example, by an air blast. It has been found that if the operative surfaces of the pressing tool are maintained in a highly polished condition, the operation of chilling the tool may be at least partially dispensed with.

Connection between the oppositely extending axial lead-wires and the respective internal tabs from the capacitance section are made by rivet members which are headed over into the composite disc, or closed bottom of the casing as the case may be. These rivets force the external lead-wires and the internal tabs into the resilient material to eliminate leakage at the passageways. The preferred construction of this riveted seal is shown in the drawing. Another compression rivet construction suitable for use in this invention is shown in S.N. 806,690, filed April 15, 1959, now U.S. Letters Patent 3,091,656 issued May 28, 1963.

The preferred connection between the rivet and the internal tabs is the compression joint with a suitable conductive washer that is shown in the drawing. Another suitable connection between the tab and the rivet is according to the welded construction and method shown and described in S.N. 1,781, filed January 11, 1960.

In order that the invention may be clearly understood and readily carried into effect, it will now be described more fully with reference to the accompanying drawing in which the sole figure illustrates a tubular casing initially closed at one end, and especially suited for a rolled electrolytic capacitance section. This example should be understood to be illustrative only and in no way limitative of the article and method of this invention.

Referring to the drawing a premolded cylindrical casing 1 of polypropylene thermoplastic material has an internal shoulder 2 formed near its open end, and an aperture 3 in its closed end. In this aperture 3 there is located a rivet 4 serving to retain internally a washer 5 and a flexible metal tab 6 from capacitance section 7, and externally a lead-wire 8. A tab 9 at the other end of capacitance section 7 and a further lead-wire 10 are secured by a rivet 11 to the composite disc which is essential according to this invention. This composite disc is constructed of a rubber layer 12 and an aluminum layer 13. The capacitor of this invention is assembled by inserting capacitance section 7 into the open end of casing 1 so as to fold tab 6 as shown in the drawing. The composite disc 12, 13 is then forced into the open end of casing 1 so as to rest against shoulder 2. A heated pressing tool having internal contours conforming generally to the outer surface of casing 1 and being curved to cause the lip to be rolled-over as shown in the drawing is then brought to bear on the casing, and then withdrawn after being chilled by an air blast subsequent to the rolling of the lip Casing 1 is provided with a plurality of suitable feet 14 to permit the capacitor to be adapted to stand-off or printed circuit mounting. The casing and the composite disc may be color-coded to indicate the terminal connection of the anode of electrolytic capacitance section 7. For example, the anode connected to the lower end could be denoted by a red case and a black disc, or a nonpolar unit could have the disc and the case of the same color.

It will be understood that the above-described embodiments have been set forth for the purpose of illustration only and that various modifications may be made by persons skilled in the art without departure from the concept of this invention which is limited only by the scope of the appended claims.

What is claimed is:

1. A cylindrical electrolytic capacitor housing comprising a premolded casing of thermoplastic material, said casing having a reduced wall thickness at one end providing an internal ledge adjacent said end, said casing being closed at said end by a composite disc consisting of an inner layer of metal and an outer layer of rubber of greater diameter than said end and said inner layer, said reduced wall being turned over to retain said disc compressed against said internal ledge with said rubber layer forming at its periphery a fluid-tight seal with said casing.

2. A cylindrical capacitor housing as in claim 1, wherein a connecting tab from an electrolytic capacitance section within said casing is attached to the inner metal layer by a rivet extending through the composite disc, and an external connector being secured to the outer end of said rivet.

3. A cylindrical capacitor housing as in claim 2, wherein said thermoplastic casing is provided with integral feet at the end opposite said one end, whereby the capacitor is adapted to stand-off mounting.

References Cited in the file of this patent

UNITED STATES PATENTS

| | | |
|---|---|---|
| 2,169,315 | Yngve | Aug. 15, 1939 |
| 2,664,455 | Williamson | Dec. 29, 1953 |
| 2,710,986 | Gray | June 21, 1955 |
| 2,904,618 | Robinson et al. | Sept. 15, 1959 |
| 2,940,021 | Hipperson | June 7, 1960 |

FOREIGN PATENTS

| | | |
|---|---|---|
| 694,758 | Great Britain | July 29, 1953 |
| 208,478 | Austria | Apr. 11, 1960 |
| 475,688 | Canada | July 31, 1951 |